United States Patent [19]

Davis

[11] 4,395,263
[45] Jul. 26, 1983

[54] UNITARY LAMINATE WITH PERMANENT INDICIA PATTERN: TRANSFER PRINTINGS ONTO PLASTIC-COATED RIGID PANELS

[76] Inventor: R. Elbert Davis, 1401 Valley View Rd., #425, Glendale, Calif. 91202

[21] Appl. No.: 789,488

[22] Filed: Apr. 21, 1977

[51] Int. Cl.³ ........................ B32B 27/14; D06P 5/13
[52] U.S. Cl. .......................................... 8/471; 8/512; 8/522; 8/506
[58] Field of Search ............................... 8/2.5 A, 471; 427/248 H, 203

[56] References Cited

U.S. PATENT DOCUMENTS

| | | | |
|---|---|---|---|
| 3,363,557 | 1/1968 | Blake | 8/2.5 A |
| 3,707,346 | 12/1972 | Markert et al. | 8/2.5 A |
| 3,751,282 | 8/1973 | Massa | 427/205 |
| 3,792,968 | 2/1974 | Rickenbacher et al. | 8/2.5 A |
| 3,829,286 | 8/1974 | Anzal et al. | 8/2.5 |
| 3,860,388 | 1/1975 | Haigh | 8/2.5 A |
| 3,952,131 | 4/1976 | Sideman | 8/2.5 A |
| 4,059,471 | 11/1977 | Haigh | 8/2.5 A |
| 4,201,821 | 5/1980 | Fromson et al. | 8/471 |
| 4,354,851 | 10/1982 | Hix et al. | 8/471 |

FOREIGN PATENT DOCUMENTS

| | | | |
|---|---|---|---|
| 864086 | 6/1978 | Belgium. | |
| 1412963 | 11/1975 | United Kingdom | 8/2.5 A |
| 1444368 | 7/1976 | United Kingdom. | |
| 2095619 | 10/1982 | United Kingdom. | |

Primary Examiner—A. Lionel Clingman
Attorney, Agent, or Firm—Nilsson, Robbins, Dalgarn, Berliner, Carson & Wurst

[57] ABSTRACT

A unitary laminate is produced bearing a permanently visible pattern of indicia. The laminate comprises a binder layer, containing pigment, and a transparent layer, each formed of hydrophobic synthetic polymer. Sublimable dyestuff is heat transferred from an auxiliary carrier web to the transparent layer to submerge the pattern into an external surface of the transparent layer.

13 Claims, 6 Drawing Figures

UNITARY LAMINATE WITH PERMANENT INDICIA PATTERN: TRANSFER PRINTINGS ONTO PLASTIC-COATED RIGID PANELS

FIELD OF THE INVENTION

The present invention relates to decorative laminate structures, and to processes involving the heat-induced transfer of sublimable dyestuff.

BACKGROUND AND SUMMARY OF THE INVENTION

This invention relates to the treatment of various surfaces so that they may be decorated by a sublimatic transfer printing process. Such printing processes involve, as a first step, full color lithographic printing on paper using so called "dispersal" dyes having the property of subliming or vaporizing to a gas when heated. A second step involves transfering the printed image under heat and, usually, pressure in a transfer press to a substrate formed of material which is receptive to the sublimable ink. The inks are capable of being printed onto the paper by lithographic printing methods using etched gravure press cylinders and standard lithographic paper, so that one can obtain the high quality, four color reproduction achievable by these techniques.

Sublimatic transfer processes have been found to be particularly useful in printing full color reproductions onto polyester fabrics. Excellent color quality and efficient transfer is possible with such fabrics, but poor results are usually obtained on non-textile items such as wood, particle board, plastic sheets, leather, rubber and other organic or natural materials. No transfer at all is feasible on glass fabric, sheet glass, metal surfaces, marble, or other inorganic materials.

The present invention provides a method for sublimatic ink transfer to any of the foregoing substrates, whether organic or inorganic. It proceeds by forming a unitary laminate which comprises, at a minimum, a binder layer containing pigment, and a transparent layer, each formed of hydrophobic synthetic polymer. Sublimable dyestuff is heat-transferred from an auxiliary carrier web to the transparent layer to provide a permanent visible pattern of indicia submerged into an external surface of the transparent layer. The laminated combination of transparent layer and pigmented binder results in an article having the color intensity and depth of a photographic print.

Practice of the present process results in the production of unique unitary laminate structures. In one embodiment, the external surface of fiberglass articles can be permanently decorated. Pigment, preferably white pigment, is incorporated in the polyester resin binder base of such articles, and a clear top layer of alkyd resin, melamine formaldehyde resin, or a combination thereof, is applied to the base. The structure is cured to produce a thermoset heat resistant unitary structure which will not soften or deform under the heat and pressure of the sublimatic transfer process. Sublimable ink can then be transferred directly to the transparent, clear top layer.

In another embodiment, one obtains a decorative article having the color depth and quality of a photographic color transparency. In particular, a sheet of polyethylene terephthalate, or other polyester plastic sheet, can be laminated to a pigment-filled similar sheet. The clear sheet can be decorated by the sublimatic transfer printing process to achieve a flexible structure which can be used to produce a number of utilitarian articles, for example, lamp shades, signs, decorative lighted displays, and other various novelty items. The flexible sheets can be laminated to a support member by using the heat of the sublimatic transfer process.

In a further specific embodiment, a rigid substrate, such as sheet metal, glass, marble, or the like, is treated so that it may be decorated by the sublimatic transfer printing process. Preferably, a primer coat is applied to the rigid substrate followed by a layer of pigmented binder and then a transparent layer is applied. The combination is cured and then subjected to a sublimatic heat transfer process. The sheet stock can be formed to a desired shape prior to or after sublimatic heat transfer.

Other aspects of the present invention will be understandable as the invention is described in more detail hereinafter. Prior art of interest to the present invention includes: Defago U.S. Pat. No. 3,782,896, which discloses various polymeric materials that are susceptible to sublimatic ink transfer; dePlasse U.S. Pat. No. 3,813,218 which discloses various sublimable dyestuffs; and Anzai et al U.S. Pat. No. 3,829,286 which discloses sublimatic transfer to various substrates such as artificial leathers, coating, films, sheets, molded products, metallic plates, wooden plates, and the like.

DETAILED DESCRIPTION

Figure 1:
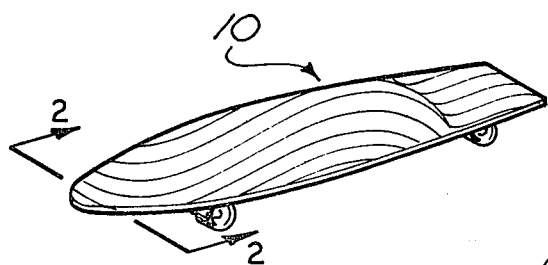
FIG. 1 is a perspective view of a decorated skateboard in which the board is formed utilizing the process of the instant application.

As required, detailed illustrative embodiments of the invention are disclosed herein. However, it is to be understood that these embodiments merely exemplify the invention, which may take forms that are different from the specific illustrative embodiments disclosed. Therefore, specific structural and functional details are not to be interpreted as necessarily limiting, but as a basis for the claims which define the scope of the invention.

The instant process comprises an improved sublimatic transfer dying process in which sublimable dyestuff is transferred from an auxiliary carrier web to a support stratum. The improvement enables a print to be formed on a non-textile stratum and comprises, in general form, the steps of: (a) laminating together as a support stratum (i) a binder layer containing pigment and (ii) on said binder layer, a transparent layer of material receptive to sublimatic dyestuff; (b) curing the laminate; and (c) transferring the dyestuff to the transparent layer by heat-induced sublimation from an auxiliary carrier web.

The binder layer and transparent layer are each formed of hydrophobic synthetic polymer, for example, phenolformaldehyde resins; polyamide resins, such as nylon and polymers obtained from dimerized fatty acids, polyester resins, unsaturated polyesters, polyethylene terephthalate, aromatic polycarbonates and polydiallyl esters; cellulose acetate; polyether resins, such as epoxy resins, polyethylene oxide, polypropylene oxide, phenoxy resins, polyphenylene oxide resins, polyoxymethylene and chlorinated polyethers, polysulfide resins; such polydimethylsiloxane amino resins, such as urea-formaldehyde resin, melamine-formaldehyde resin; alkyd resin; heterocyclic polymers, such as polyamide resins; polybenzimidazoles and polybenzothiazoles; polyacrylate resins, such as polymethyl methacrylate, polyethyl acrylate, methyl chloroacrylate, cyclohexyl methacrylate and polymethyl-2-cyano-acrylate; polyacrylonitrile resins; acrylinitrile-butadiene resins; polyfluorolefin resins such as polytetrafluoroethylene, polymonochlorotrifluoroethylene and fluorinated elastomers; vinylidene chloride; polyolefin resins, such as polyethylene, polypropylene, polyisobutylene, polypentene-1, poly-4-methylpentene-1, polybutadiene, poly-3-methylbutene-1, polyisoprene and poly-2-chlorobutadiene; polystyrene resins; copolymers of dicyanoethylene and vinyl acetate; and polyvinyl resins, such as polyvinyl chloride, polyvinyl acetate, polyvinylidenechloride, polyvinyl alcohol, polyvinyl acetals, polyvinyl pyridine, polyvinyl fluoride, polyvinyl pyrrolidone, polyvinyl carbazole and polyvinyl cinnamate. See also, for example, the polymers referred to in the above noted Defago U.S. Pat. No. 3,782,896.

Depending upon the specific application, preferable hydrophobic synthetic polymer materials for the binder include polyester resin, polyethylene terephthalate in sheet form, such as Mylar and Kaptan, alkyd resin, melamine formaldehyde resin, and combinations of alkyd resin and melamine formaldehyde resin. Preferable hydrophobic synthetic polymer materials for the transparent layer are polyethylene terephthalate in sheet form, alkyd resin, melamine formaldehyde resin, and combinations of alkyd resin and melamine formaldehyde resin. The alkyd resin is further preferably a soya or coconut alkyd resin. Useful combinations with melamine formaldehyde resin include 60 parts ±30 of the alkyd resin and 40 parts ±30 of the melamine formaldehyde resin. With the foregoing preferred polymer materials, the binder layer and transparent layer can be heat cured to give a thermoset heat resistant and solvent resistant unitary laminate. Curing can be exemplified by 15 minutes at 300° F. with any of the foregoing preferred polymeric materials, but can be accomplished in quicker time at higher temperature, such as 3 minutes 350° F. to 600° F. The specific idealized temperature and time can be found for any of the particular polymers utilized.

All the foregoing preferred polymers become mold cured on baking so that the transparent layer does not stick to the transfer paper or fuse with the inks on the transfer paper during the sublimatic transfer process. Specific advantage can be obtained by using a polymer material which thermosets upon heating, so that the coating will not soften or deform under the heat and pressure of the transfer process. Such processes are conducted, for example, at 400° F. at 100 psi pressure for about 60 seconds. On the other hand, where heat deformable materials are used, lamination to a support member can be accomplished simultaneously with heat transfer.

As sublimable dyestuffs, one can use any dyestuff which heretofore has been known for that purpose, such as dispersion dyestuffs which pass into the vapor state under the heat and pressure conditions utilized for sublimatic heat transfer. Such transfers can occur without the application of pressure, but are more readly controllable by applying a small amount of pressure, such as 10 psi–110 psi at 400° F. for a period of time ranging from 15 seconds to 60 seconds. Exemplary dyestuffs are sublimable azo or anthraquinone dyestuffs or nitroarylamines, styryl dyestuffs, derivatives of quinophthalone, perinones and the like, 4-dimethylaminoanthraquinone, brominated or chlorinated 1,5-diamino-4,8-dihydroxyanthroaquinone, 3-hydroxyquinophthalone, 1-hydroxy-3-phenoxy-r-aminoanthraquinone, 4-(4'-methyl-2'-nitrophenylazo)-3-methyl-5-pyrazolone and 1-amino-2-cyano-4-anilido-anthraquinone, the propyl or butyl ester of 1,4-diaminoanthraquinone-2-carboxylic acid, 1-amino-2-cyano-4-cylcohexylaminoanthraquinone and 2-hydroxy-5-methyl-4'-acetylamino-azobenzene. See in this regard, the dyestuffs referred to in de Plasse U.S. Pat. No. 3,813,218, the disclosure of which is incorporated herein by reference.

Figure 2:
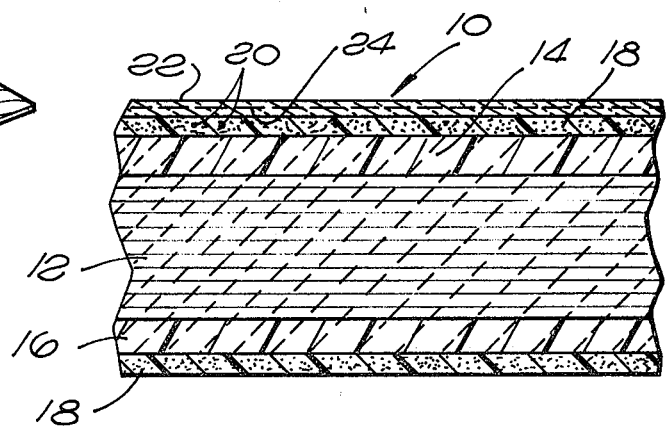
FIG. 2 is a cross-sectional view of the board of FIG. 1, taken on line 2—2 of FIG. 1.

Referring now to FIGS. 1 and 2, there is illustrated a particular utility to which one can put the instant process. A laminate structure 10 is provided which is in the form of an elongate board which has been cut and smoothed to form a skateboard. Referring more closely to the structure in FIG. 1, one can see that there is provided a board structure having a central core of glass fiber rovings 12 sandwiched between mat sheets 14 and 16. The components are all impregnated with and encased by cured polyester resin 18. The structure depicted in FIG. 1 is not simply a combination of layers which are separately formed and then subsequently joined by heat or otherwise, but is an integral unitary structure in which the resin 18 permeates and pervades the entire structure.

The present embodiment is particularly useful with thermosetting resins such as polyester resins. Such resins are formed by the catalyzed reaction of an unsaturated dibasic acid or anhydride and a dihydric alcohol in a reaction monomer such as styrene, which as a result of its olefinic nature, takes part in the reaction. The specific form of precursor resin exemplified herein is a polyester resin obtained from the reaction of maleic anhydride and diethylene glycol in styrene, catalyzed by bis-4-tertbutylcyclohexylperoxydicarbonate.

In terms of the general process, in this embodiment, the polyester acts as the binder layer. In accordance herewith, a sufficient amount of pigment is incorporated in the polyester resin, as indicated at 20 in FIG. 2, to produce a base color. Preferably, titanium dioxide or other white pigment is used so as to produce a white base color. Generally about 8 parts ±6 of pigment per 100 parts of resin can be used. The glass fibers, which can be in the form of roving, mat and/or glass fabric constitute about 50–85 weight percent of the fiberglass-polyester resin-pigment combination.

In accordance with this specific embodiment, a clear transparent top layer of alkyd-melamine coating 22 is applied to one side of the fiberglass-polyester resin board. A specific alkyd resin solution which is particularly useful is a 60% solid solution in xylene of a baking-type alkyd resin of the short-oil oxidizing type, relatively high in phthalic anhydride content and reacted with polyhydric alcohols in oils with the following exemplary specification: phthalic hydride 39%, oil 42% (principally soya type or coconut type), acid No. 5–8 viscosity Z-6, color 3–6. A typical commercial material of this type is available from Rohm & Haas under the trademark Duraplex A-29 or from Reichhold Chemical Company. The melamine-formaldehyde resin is from a class of polymers formed by the reaction of urea, melamine, or other triazines with formaldehyde and an alcohol to produce an ether-type structure. The alcohol may be propyl, butyl, octyl, or the like, and serves to promote solubility of the urea or melamine formaldehyde condensate in organic solvents such as xylene. The condensate is capable of reacting further to yield large polymer molecules and interacting with the alkyd to provide the cross-linked thermosetting structure with heat resistance and solvent resistance sufficient for the hot sublimatic transfer. The material used can have the following exemplary specification: percent solids 50% in xylene and butanol 1:1, acid No. 1–1.5, specific gravity 0.97, viscosity F–K. A typical commercial material meeting the foregoing requirements is obtainable from Rohm & Haas Company under the trademark Uformite MM-55, or is obtainable from Reichhold Chemical Company. A specific exemplary ratio useful herein is 60 parts alkyd resin and 40 parts melamine formaldehyde resin.

After the transparent layer has been applied to one side of the pigment-containing polyester binder layer, the structure can be cured; for example, for one hour at 225° F. or for 15 minutes at 300° F. in an oven, or for 3 minutes at 350°–650° F. using infrared heating, to produce a thermoset heat-resisting coating. An auxiliary paper web containing the desired design in the form of sublimatic ink carried on the web is placed in face-to-face contact with the transparent layer and heated at 400° F. under 100 psi pressure for about 60 seconds. The paper is stripped away to yield a decorated structure. As a result of the process, the sublimatic ink is submerged into an external surface of the transparent layer as indicated schematically at 24 in FIG. 5. In practice, the dye submerges into the layer about 1–10 mm. Accordingly, an indicia pattern is provided which, effectively, is as permanent as the board itself.

All three elements of the foregoing combination; namely, binder, pigment in the binder, and transparent overcoating on the binder, are required to yield a structure having a crisp, fine-grade image of photographic quality. As indicated, the pigment is preferably white pigment such as titanium dioxide, calcium carbonate or alumina, but other pigments for special effects can be used, such as lead carbonate, betaoxynaphthalene red or aluminum powder or flake.

Figure 3:
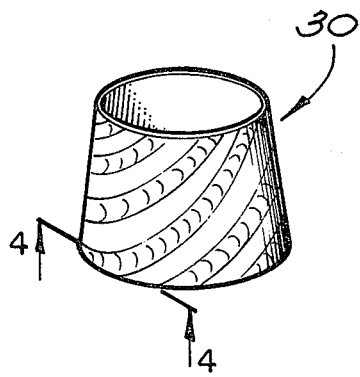
FIG. 3 is a perspective view of a lamp shade decorated in accordance with the present invention.
Figure 4:
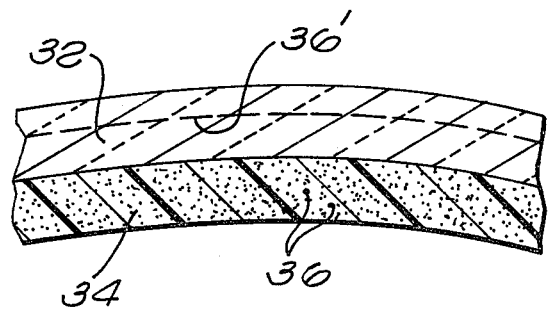
FIG. 4 is a cross-sectional view of the shade material of FIG. 3, taken on line 4—4 of FIG. 3.

Referring now to FIGS. 3 and 4, there is shown a lampshade 30 formed by laminating a transparent sheet 32 of Mylar to a binder layer 34 of pigmented hydrophobic synthetic polymer, the pigment being indicated at 36 in FIG. 4. The clear Mylar top layer, being a polyester receptive to the sublimatic inks, and being sufficiently heat resistant to withstand the hot press transfer step, is a substitute in this case for the clear alkyd-melamine coating utilized in the embodiment depicted in FIGS. 1 and 2.

The use of a white binder layer 34 and clear top layer 32 results in true photographic quality color images, and the resultant printed laminate can be used to form a variety of decorative products such as wall plaques, signs, displays or the like. With an added bottom layer of pressure sensitive adhesive, the laminate can be used to decorate other solid substrates. Sublimatic heat-induced transfer is conducted in the same manner as indicated above for the board of FIGS. 1 and 2 by applying an auxiliary web containing the design to be transferred in face-to-face relationship with the top transparent layer, in flat sheet form, and applying pressure of about 100 psi at 400° F. for about 60 seconds. The pattern of indicia is submerged into the surface of the clear top layer, as indicated at 36'.

In a specific further embodiment, when the binder layer is formed of a thermoplastic material such as Mylar, polyethylene terephthalate, kaptan, or the like, the binder layer can be laminated to any support substrate simultaneously with the sublimatic printing process. Thus, while the clear top layer of Mylar is receiving a sublimatic transfer image, the bottom binder layer can be laminated to a rigid support substrate, to form a plaque or the like.

Figure 5:
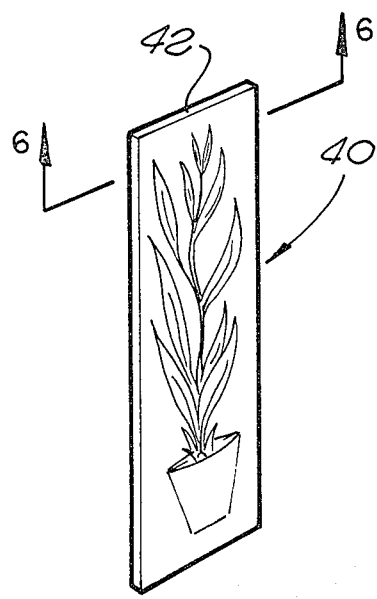
FIG. 5 is a perspective view of a wall plaque formed of a rigid metal substrate in accordance with the instant invention.
Figure 6:
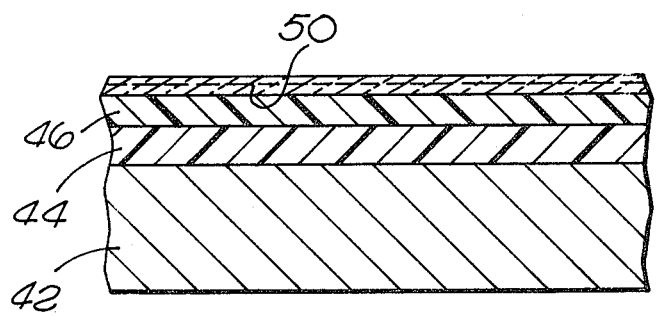
FIG. 6 is a cross-sectional view of the plaque of FIG. 5, taken along line 6—6 of FIG. 5.

Referring to FIGS. 5 and 6, a further embodiment of the invention is illustrated in which a surface that normally is not receptive to sublimatic ink is treated so as to receive such ink. The substrate in this illustration is of rigid material, such as metal; for example, steel, stainless steel, aluminum, or the like, or can be of glass, wood, particle board, marble, or other rigid substrate. Additionally, the rigid substructure could be an injection molded plastic having a surface which is otherwise receptive to sublimatic ink but for which it is desired to provide improved receptivity. For example, the substrate may be formed of injection molded nylon, cast or injection molded acrylic, phenolic laminates, melamine laminates, such as sold under the trademarks Formica and Micarta, and the like, imitation marble such as silica filled polyester resin castings, and heat formable plastic sheet material. Commercial applications can be found in the decoration of table tops, wall plaques, and the like. Flat sheet stock can be subjected to the sublimation transfer process and then finally formed to shape by bending, stamping, extrusion, or other postforming processes. Alternatively, a preformed part may be coated and then decorated using formed dyes for sublimation transfer printing in place of the conventional flat platens. Commercial applications for such formed articles include serving trays, extruded or formed picture frames, plaques, and the like.

The specific embodiment illustrated is a plaque 40 in which the supporting substrate 42 is aluminum. A binder layer can be applied directly to the aluminum substrate, but it is preferred when dealing with metal or other inorganic surface to provide a primer coat 44. Such coat is formed of organic polymer material which adheres readily to a metallic surface and cures quickly. A particularly useful material is formed of polyvinyl butyral and phenolic resin in isopropyl alcohol. Other examples are cross-linkable polyurethane in methyl ethyl ketone and toluene and acrylic resin oligomer in acrylic monomer. The binder layer 46 can be applied to the primer layer and is exemplified by a white pigmented (titanium dioxide) alkyd-melamine layer having a composition similar to that applied as the top layer 22 in FIG. 2. The pigmented binder layer then can be top coated with a clear layer 48 of the same alkyd-melamine formulation.

Each of the foregoing layers are thermosetting and the entire combination can be cured for 15 minutes at 300° F. to provide a unitary laminate structure. A sublimatic ink transfer process is then conducted in which a paper web carrying the desired design in the form of sublimable ink if applied in face-to-face contact with the top layer 46 and subjected to sufficient pressure and heat to transfer the image from the auxiliary web to the top layer 46; for example, 400° F. at 100 psi pressure for 60 seconds. The result is a design which is submerged into the surface of the top layer, as indicated at 50 in FIG. 6.

I claim:

1. In a sublimination transfer dyeing process in which sublimable dyestuff is transferred from an auxiliary carrier web to a support stratum, the improvement whereby a print can be formed on a non-textile stratum, comprising the steps of:
   (a) laminating together as said support stratum (i) a binder layer comprising polyester resin containing 50-85 weight percent glass fiber and containing pigment and (ii) on said binder layer, a substantially pigment-free transparent layer of thermosettable material receptive to sublimatic dyestuff selected from alkyd resin, melamine formaldehyde resin and combinations thereof;
   (b) curing to form a thermoset, heat resistant laminate; and
   (c) transferring said dyestuff to said transparent layer by heat-induced sublimation from said auxiliary carrier web.

2. The improvement of claim 1 in which said laminate is cured at a temperature in the range of 200° F.-600° F.

3. The improvement of claim 1 in which said pigment is white pigment.

4. The improvement of claim 1 in which said pigment is titanium dioxide.

5. In a sublimation transfer dyeing process in which sublimable dyestuff is transferred from an auxiliary carrier web to a support stratum, the improvement whereby a print can be formed on a metal substrate, comprising the steps of:
   (a) laminating together as said support stratum (i) a binder layer applied directly to a rigid metal substrate, said binder layer containing pigment and (ii) directly on said binder layer, a substantially pigment-free transparent layer of thermosettable material receptive to sublimatic dyestuff;
   (b) curing to form a thermoset, heat resistant laminate; and
   (c) transferring said dyestuff to said transparent layer by heat-induced sublimation from said auxiliary carrier web.

6. The improvement of claim 5 in which said binder is selected from alkyd resin, malamine formaldehyde resin and combinations thereof, containing said pigment, and said transparent layer is selected from alkyd resin, melamine formaldehyde resin, and combinations thereof.

7. The improvement of claim 5 in which a primer coat is applied to said rigid substrate prior to application of said binder.

8. The improvement of claim 7 in which said primer comprises a combination of polyvinyl butyral and phenolic resin in a solvent therefor.

9. The improvement of claim 8 in which said solvent is isopropyl alcohol.

10. The improvement of claim 5 in which said substrate is a sheet of aluminum metal.

11. The improvement of claim 5 in which said laminate is cured at a temperature in the range of 200° F.-600° F.

12. The improvement of claim 5 in which said pigment is white pigment.

13. The improvement of claim 5 in which said pigment is titanium dioxide.

* * * * *